Dec. 30, 1941.  J. D. RYAN  2,268,266
LAMINATED SAFETY GLASS AND PROCESS OF PRODUCING IT
Filed March 12, 1938  4 Sheets-Sheet 1

Inventor
JOSEPH D. RYAN.
By Frank Fraser
Attorney

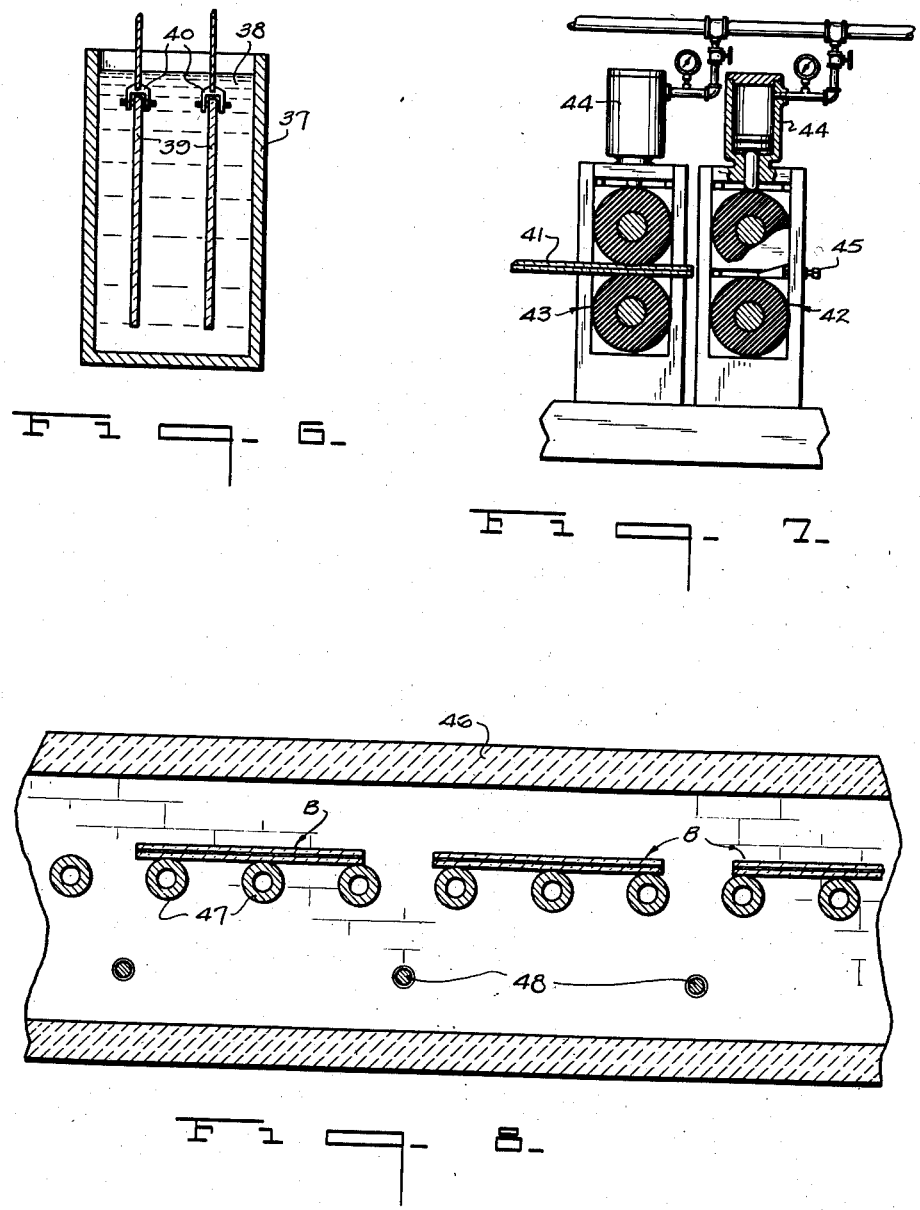

Dec. 30, 1941.     J. D. RYAN     2,268,266
LAMINATED SAFETY GLASS AND PROCESS OF PRODUCING IT
Filed March 12, 1938     4 Sheets-Sheet 3

Inventor
JOSEPH D. RYAN.
By Frank Fraser
Attorney

Dec. 30, 1941.  J. D. RYAN  2,268,266
LAMINATED SAFETY GLASS AND PROCESS OF PRODUCING IT
Filed March 12, 1938   4 Sheets-Sheet 4

Inventor
JOSEPH D. RYAN.
By Frank Fraser
Attorney

Patented Dec. 30, 1941

2,268,266

UNITED STATES PATENT OFFICE 2,268,266

LAMINATED SAFETY GLASS AND PROCESS OF PRODUCING IT

Joseph D. Ryan, Toledo, Ohio, assignor to Libbey-Owens-Ford Glass Company, Toledo, Ohio, a corporation of Ohio Application March 12, 1938, Serial No. 195,435

14 Claims. (Cl. 49—81)

This application is a continuation in part of my application Serial No. 63,065, filed February 10, 1936.

My invention is directed to a new article of manufacture, namely, laminated safety glass, and to a new and improved method or process for producing laminated safety glass.

My safety glass and method of producing it differs from commercial prior art practices in a number of important respects. Among other things—

(1) I have discovered that I can employ a preformed, transparent thermoplastic layer of material having the characteristic of being "under-plasticized," or, stated differently, possessing a plasticizer content substantially less than the plasticizer content of the interlayer of the finished safety glass product.

(2) That when using such an "under-plasticized" preformed layer, the glass or preformed layer, or both, are provided with compatible layers or coatings of plastic having the characteristic of being "over-plasticized," with the variations in plasticizer content between the preformed layer or sheet and the "over-plasticized" coatings being so compensated for that when the plastic layers are blended together into a homogeneous interlayer adherent to the glass sheets, a single plastic layer will be present of a substantially predetermined and uniform plasticizer content.

(3) I have further discovered that I can quite readily obtain suitable diffusion or equalization of plasticizer distribution between layers of like plastic material, but differing widely from one another in plasticizer content, to produce a commercially satisfactory homogeneous plastic interlayer having substantially predetermined characteristics especially as to plasticizer content.

(4) I have further discovered that certain plastics, such as the polyvinyl acetal resin plastics, which are normally tacky at normal temperatures when sufficiently plasticized for safety glass use, can be made into preformed sheets containing a deficiency of plasticizer sufficient to avoid such tacky condition, thus permitting handling, cutting, washing, etc. thereof, and then thereafter raising the plasticizer content of said preformed sheet by associating with it other layers or coatings of similar plastic extremely rich in plasticizer content, so that upon final amalgamation of the preformed sheet and associated layers into a single interlayer, a satisfactory amount of plasticizer will be present therein.

(5) I have also made the unexpected discovery that suitably prepared glass and thermoplastic laminations can be firmly and satisfactorily united or bonded together without resorting to the customary high pressure treatment heretofore deemed necessary commercially for the final compositing operation. In lieu of the customary heat and pressure treatment heretofore thought essential to bring about adequate adherence of the laminations to one another during final compositing for commercial production of laminated safety glass, I employ a relatively gentle heat soaking treatment in total absence of pressure to finally composite the laminations together. That is, with use of elevated temperatures, I am able to take a laminated safety glass sandwich, in which the glass and plastic laminations are in non-bonded relationship, and render them permanently adherent to one another without the application of any pressure whatever.

(6) Laminated safety glass made in accordance with my no pressure, final compositing process is an entirely new laminated glass possessing the characteristic of absence of internal strain as shown by examination thereof by polarized light.

(7) Further, my safety glass is made in such a way that, strictly speaking, the preformed thermoplastic sheet per se is not molded to the glass surfaces, nor are the glass sheets deformed to render them in contacting relationship to the preformed sheet. Instead, I place between the glass and preformed plastic interlayer a very highly plasticized plastic mass capable of readily molding itself to conform exactly to the contours of both the glass and plastic sheets at the relatively low temperatures present when assembly is made.

In the drawings in which like numerals are employed to designate like parts throughout the same:

Fig. 6 illustrates a tank or other receptacle adapted to contain a bath of material in which the preformed sheet, coated glass sheets, or both, may be immersed;

Fig. 7 is a diagrammatic illustration of one method of molding the highly plasticized plastic to the contours of the glass and preformed sheet;

Fig. 8 shows an apparatus that may be used for heating the sandwiches to promote diffusion of plasticizer throughout the plastic material disposed between the glass sheets and to render the glass and plastic laminations permanently adherent to one another;

Figure 1:
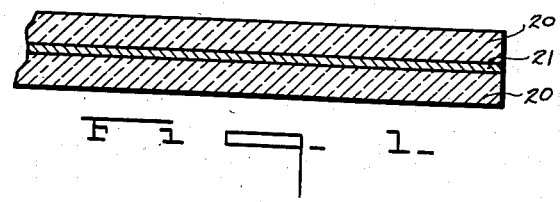
Fig. 1 represents a finished sheet of laminated safety glass.

Heretofore in the manufacture of laminated safety glass, comprising two sheets of glass and an interposed transparent layer of thermoplastic material, it has been the practice in commercial operations, with which I am familiar, to suitably prepare the laminations as by cleaning, application of adhesives, etc., and to then arrange them in proper superimposed relationship and to subject the sandwich thus formed to substantial heat and substantial pressure to effect molding of the preformed plastic interlayer and bonding thereof to the glass. That is, regardless of the particular thermoplastic material employed as the interlayer or the forms of adhesives or other bond-inducing mediums utilized, it has been thought necessary to subject the sandwich during the final compositing treatment to heat and pressure and in all cases to relatively substantial pressure to obtain the bond sought for. Various types of pressure equipment have been used commercially such as, for example, the well known heated platen presses, rubber bag autoclaves in which the sandwiches are placed within flexible containers immersed in a tank fitted to subject the sandwich while in the container to substantial pressure coupled with temperature control, and the more recent type of autoclave treatment in which the sandwiches, after preliminary pressing, are placed in the autoclave and subjected to the direct action of a heated fluid under pressure.

Regardless of the type of pressure equipment used, I am satisfied that intimate contact and adherence between the glass and plastic interlayer is induced by a combination of actual molding of the thermoplastic preformed sheet between the glass and deformation of the glass sheets themselves. If it were possible to commercially make the glass sheets and preformed plastic sheet absolutely uniform in thickness and with surfaces absolutely plane, the problem would be different, but in practice it is found that such ideal conditions do not exist.

In accordance with the present invention, no pressure whatever is employed in the final compositing operation, nor are the laminations bonded together prior to commencement of the final compositing treatment. To the contrary, I employ a process in which the glass and plastic laminations are arranged in non-bonded relationship and are then permanently bonded or united together by temperature control only. In one form of this new process, the non-bonded laminations are subjected to what may be termed a heat soaking treatment which has been found sufficient to promote excellent adhesion between the glass and plastic interlayer, which in itself is an unexpected result because the bond is obtained in total absence of pressure treatment heretofore believed essential in the final compositing step, coupled with the new and unexpected result that all of said laminated glass so produced shows a total absence of internal strain when examined by polarized light.

I am able to satisfactorily and permanently bond the glass and plastic interlayer together, without using pressure in the final compositing thereof, because of the use of an extremely mobile plastic cushion or leveling layer between the glass and preformed sheet which, after serving its initial function of permitting the glass to be "floated" into proper position with respect to the preformed sheet without apparent deformation of either, amalgamates or becomes a permanent part of the plastic interlayer. Broadly speaking, this readily moldable, space filling transparent cushion, is a plastic having an extraordinarily high plasticizer content and is compatible with the preformed sheet as well as possessing the characteristic of permanent adherence toward glass, which latter properly is made effective upon the application of heat only in total absence of pressure.

Fortunately, the success of the process is not dependent upon utilization of any particular thermoplastic composition. I have had equally satisfactory results with cellulosic derivative compositions and synthetic resin plastics. Naturally, different thermoplastic materials require different specific treatments, but fundamentally the same process is used for both types of plastics.

The polyvinyl acetal resins, when properly plasticized, are extremely desirable as an interlayer of laminated safety glass structures. These resins differ in many respects from the cellulose derivative plastics such as pyroxylin plastic and cellulose acetate plastic. As cellulose acetate and polyvinyl acetal resin plastics are representative examples of thermoplastics which I have used in working out my process, I will confine the detailed description and explanation herein to these materials, although it will be appreciated that the invention and claims are not restricted to such plastics, as any thermoplastic material suitable for use in laminated safety glass can be handled in the same way.

In Fig. 1 is illustrated diagrammatically a completed sheet of laminated safety glass comprising two sheets of glass 20 and an adherent interlayer of thermoplastic material 21. In accordance with my invention, the final interlayer of the finished sheet of glass may be produced in a number of different ways. Although the polyvinyl acetal resin plastics differ in some respects as to physical characteristics from the cellulosic derivative plastics (cellulose acetate plastic, etc.), nevertheless both types of thermoplastic materials may be employed in the manufacture of laminated safety glass in accordance with the disclosure made herein.

It is not uncommon to use 80 or 90 parts plasticizer per 100 parts cellulose acetate in cellulose acetate plastic intended as a safety glass interlayer, but even with this or higher amounts of plasticizer, the cellulose acetate is not tacky at normal temperatures and no difficulty is encountered in packing, shipping, washing, or otherwise preparing the cellulose acetate plastic for fabrication with glass.

Experience has shown that with some of the useful plasticizers, 50 parts thereof per 100 parts of polyvinyl acetal resin by weight is adequate, although obviously the amount of plasticizer can be varied at will as is well understood in the art. Nevertheless, we can assume for the purposes of this application that 50 parts plasticizer per 100 parts synthetic resin is desirable.

The polyvinyl acetal resins are formed by the reaction of aldehydes on partially or wholly hydrolyzed polymerized vinyl esters, and by varying the aldehydes used in the reaction product, different forms of resins can be created; the use of formaldehyde giving the Formvar resin; the use of acetaldehyde giving the Alvar resin; and the use of butyraldehyde giving the Butylvar or Butvar resin. After production of the resin, it is then necessary to properly plasticize it to adapt it for safety glass uses, and when these types of resins are plasticized with approximately 50 parts plasticizer, the resulting plastic is soft and tacky at normal room temperatures. This has necessitated special handling, packing, etc. when the plastic is made into a preformed sheet as distinguished from the method of extruding or flowing the resin plastic directly upon the glass to which it is to be united.

Cellulose acetate sheeting can be formed into a continuous ribbon and wound upon a drum and shipped without providing any spacing material or other protective means between the convolutions of plastic upon the drum. However, when the polyvinyl acetal resins and other similar types of synthetic resins are plasticized sufficiently to qualify as a laminated safety glass interlayer, they cannot be made into a continuous ribbon and wrapped upon a drum as is done with the cellulose acetate plastic because the layers of sheeting will stick together and even amalgamate into a solid cylinder of no use as sheeting to the manufacturer of safety glass.

To prevent this result, it has been the custom in the past to use special precautions in the shipping of the resin plastic materials, and in warmer weather shipment in refrigerator cars has been advocated. Even after shipment of the material in refrigerator cars or by other means, the laminated glass manufacturer is still faced with the problem of cleaning the surfaces of the resin plastic, cutting it to size, etc. before fabricating it with glass. It will be appreciated that with a sticky, tacky plastic sheet, proper cleaning and cutting of the material is extremely difficult.

I have discovered that these difficulties can be largely, if not entirely eliminated, by making up a preformed sheet of the synthetic resin plastic containing a smaller amount of plasticizer than that ultimately present in the sheet in the finished laminated safety glass. Broadly speaking, the idea is to make up an initial batch of synthetic resin and plasticizer wherein the ratio of plasticizer is somewhat less than the ratio of plasticizer in the finished interlayer of a laminated safety glass sheet, but including enough plasticizer that the mass can be reduced to sheet form and placed in the hands of the glass and plastic fabricator who can cut, clean, and use the plastic without difficulty.

Then to supplement the plasticizer content and to bring it up to a substantially predetermined amount, a specially prepared plastic mass, the properties of which will be described later, is placed upon the glass sheets and the preformed plastic layer sandwiched between the coated sheets, following which compositing is effected by a heat soaking or temperature control treatment only in absence of pressure.

In those cases where the preformed sheeting is made with much less than the desired amount of plasticizer, its thickness will likewise be proportionately less than that of the final interlayer of plastic between the glass sheets. For example, if the plastic interlayer desired between the glass sheets is .025 inch in thickness, the preformed sheeting made with the reduced plasticizer content may run about .020 inch in thickness. Thus, during fabrication of the plastic with the glass, the thickness of the plastic layer is materially increased as well as the plasticizer content. While one phase of my invention relates broadly to the idea of initially producing a preformed transparent thermoplastic layer of material having the characteristic of being "under-plasticized," that is, possessing a plasticizer content substantially less than the plasticizer content of the interlayer of the finished safety glass product, by way of example the following data is set forth:

*Example 1*

Going on the assumption that the finished plastic layer between the glass sheets should contain 50 parts of plasticizer per 100 parts of synthetic resin and that the thickness thereof is to be .025 inch, the preformed sheeting can be made into a thickness of .020 inch. The weight of the finished plastic, namely, the .025 inch plastic, having approximately 50 parts plasticizer, will be about 80 grams per square foot, composed of 53⅓ grams of resin and 26⅔ grams of plasticizer.

A non-tacky preformed sheet of polyvinyl acetal resin plastic, for example .020" in thickness, can be made with a plasticizer content of approximately 33 parts per 100 parts of resin and this mixture will weigh about 64 grams per square foot, of which 48 grams will be resin and 16 grams plasticizer.

A sheet made of these amounts of materials can be handled, shipped, cut, washed, and otherwise prepared for lamination in much the same manner as sheeting of cellulosic derivative plastics. In other words, under these circumstances, no particular precautions are required.

Based on the example above, to bring the plastic thickness up to .025 inch and the plasticizer content to about 50 parts by weight, the sheeting has to be supplemented with a coating weighing approximately 16 grams per square foot in the ratio of 33⅓ parts resin to 66⅔ parts plasticizer, which on a weight basis is 5⅓ grams of resin to 10⅔ grams plasticizer. However, in carrying out my no pressure process of final compositing and to insure proper floating of the glass into position upon the preformed sheet through the intermediary of the highly plasticized plastic leveling layer, said layers, which are also intended in this example to increase the thickness of the interlayer and plasticizer content, should be applied in excessive amounts, the excess being expelled from between the laminations before commencement of the final compositing thereof. Experience has shown that although I have present at time of assembly an excess of the overplasticized mass, by controlling the mass as set forth in this application, the plastic interlayer of the finally composited laminated safety glass will have a substantially predetermined and uniform plasticizer content. In other words, although reference is made to "excess" mobile plastic layers, the method is so handled that non-permissible variations in plasticizer content in any given process are not experienced.

It is preferable that both sheets of glass be covered on one surface each with the leveling plastic material and if the coating is applied to both sheets of glass, the film of dope required on each sheet will weigh at least 0.055 gram per square inch.

Figure 2:
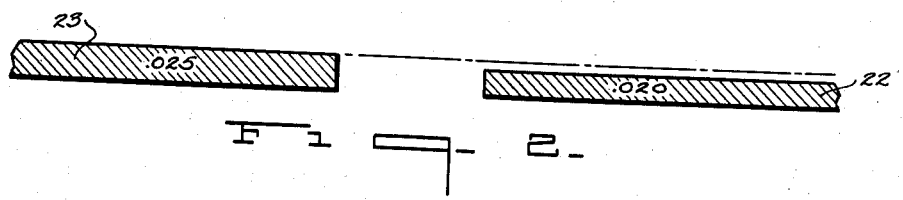
Fig. 2 is a diagrammatic representation of two sheets of plastic side by side, the sheet to the left in Fig. 2 showing the thickness of plastic layer between the glass sheets in Fig. 1, and the sheet to the right in Fig. 2 showing the thickness of sheet prior to its increase in thickness and plasticizer content.

To the right in Fig. 2 is the preformed sheet 22, whereas to the left in Fig. 2 is the same sheet 23 after its thickness and plasticizer content has been increased when used as an interlayer in the safety glass structure of Fig. 1.

Figure 3:
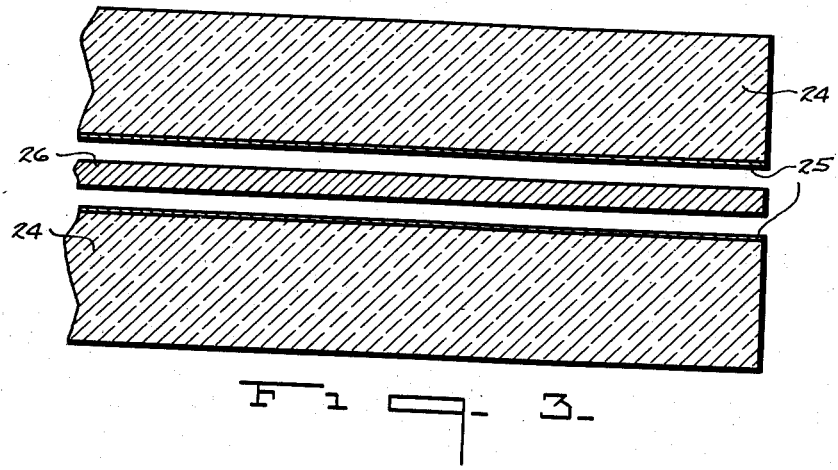
Fig. 3 is a diagrammatic showing of two sheets of glass each with a mass of plastic material thereon and an interposed layer of plastic.

In Fig. 3 is illustrated the sandwich at time of assembly with the laminations being arranged in spaced relationship. It will be noted that each glass sheet 24 is provided with a substantial coating of plastic 25, with the preformed sheet of thermoplastic material 26 being disposed between said coated glass sheets.

Figures 4, 5:
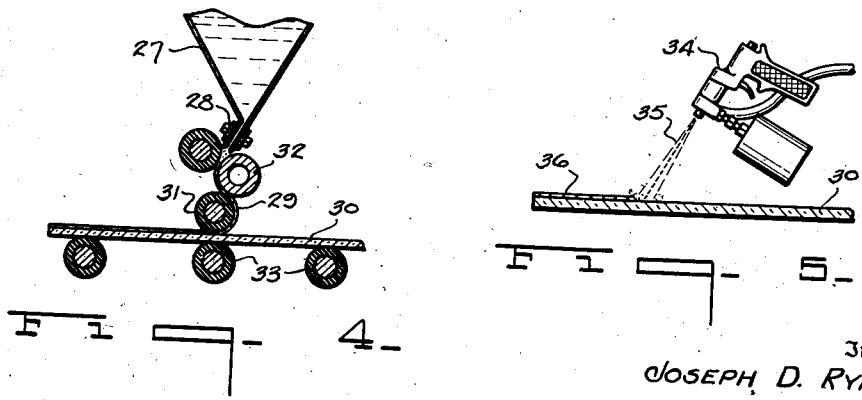
Fig. 4 is a diagrammatic showing of one form of device that may be used to apply a layer of the highly plasticized material upon the glass sheets.
Fig. 5 illustrates diagrammatically the formation of such a mass of plastic on the glass sheets by spray apparatus.

The coatings, films, or deposits created or placed upon the glass sheets may be prepared in a number of ways, and this invention is in no way limited to any selected manner of applying said films to the glass. However, by way of example, I wish to point out that very successful results have been obtained when using the types of apparatus illustrated diagrammatically in Figs. 4 and 5. In Fig. 4, a hopper 27 is provided to hold a supply of the plastic dope material and suitable temperature controlling means are of course associated therewith. Issuing from the orifice 28 is the dope 29 applied to the glass sheet 30 by means of the heated roll 31. The roll 32, which may also be heated, is used to assist in controlling the thickness of deposit of dope upon the glass. The glass sheet 30 may be supported upon the conveyor 33 which can be operated to successively carry sheets of glass beneath the coating roll 31 at a speed designed to give a predetermined thickness of plastic mass on said glass. It will of course be understood that the temperature of the glass as well as humidity conditions surrounding the machine may be and are controlled as desired.

In Fig. 5 a different type of apparatus is illustrated, the roller 34 designating a spray gun in its entirety designed to spray the dope 35 upon the glass sheet 30 to form the film 36 thereon. As in the case of the film applying machine of Fig. 4, the temperature of the glass and highly plasticized plastic, as well as the humidity of the surrounding atmosphere should be carefully controlled to give best results.

With some types of plastics it may be desirable to flush the preformed sheet and/or coated glass with plasticizer or other liquid, and to this end a tank 37 of plasticizer 38 or other material or composition may be used. As shown, sheets of preformed plastic 39, carried by the hangers 40, are immersed in a tank of the liquid material.

After the glass sheets have been coated with the readily moldable plastic extremely rich in plasticizer content and, if desired, flooded with additional plasticizer or other material which can be tolerated in the finished plastic interlayer (which of course necessitates its being non-volatile to the point of being stable in the finished laminated safety glass) and the preformed sheet has been suitably prepared, the laminations are placed together in proper arrangement to form the sandwich. It may be mentioned that with some materials, it may even be desirable to assemble the coated glass and preformed sheet while in a bath of liquid such as plasticizer. Whatever particular method is used, after the laminations have been arranged in sandwich form, they are subjected to non-bonding pressure designed to expel excess matter from between the laminations.

In Fig. 7 is shown a form of equipment which has been found to be very satisfactory for this expellation of excess plastic (or other matter) from between the laminations. It will be noted in the examples given above and the examples given hereinafter that the coatings applied to the glass sheets are plastic coatings extraordinarily rich in plasticizer content. However, I have found that these coatings may be coatings of plastic material as distinguished from mere films or washes of plain plasticizer. When the plastic coatings are applied to the glass sheets, the glass and dope temperatures are so controlled that a rather substantial body or mass of material can be built up on the glass even in excessive amounts. Then, after assembly of the coated glass with the preformed sheet, the temperature is elevated sufficiently to permit expellation of excess moldable plastic by means of a machine such as the one shown in Fig. 7, but this is done in a way that sufficient soft plastic is left between the preformed sheet and glass to entirely fill the space therebetween.

In Fig. 7 the safety glass sandwich 41 is shown as passing between two pairs of rollers 42 and 43. The rollers are preferably rubber or rubber faced and may be operated by means of air cylinders 44 or other means to urge them toward one another. Gauge blocks 45 or other positive stops may be used to control the gap between the rollers. Preferably, the first pair of rollers are set further apart than the second or final pair of rollers. This machine may be mounted in a suitable chamber so that temperature of the sandwich can be controlled during this treatment.

The amount of pressure exerted upon the sandwich is sufficient to expel excess soft plastic and non-condensable gases from between the laminations but is inadequate to unite the laminations.

Figure 11:
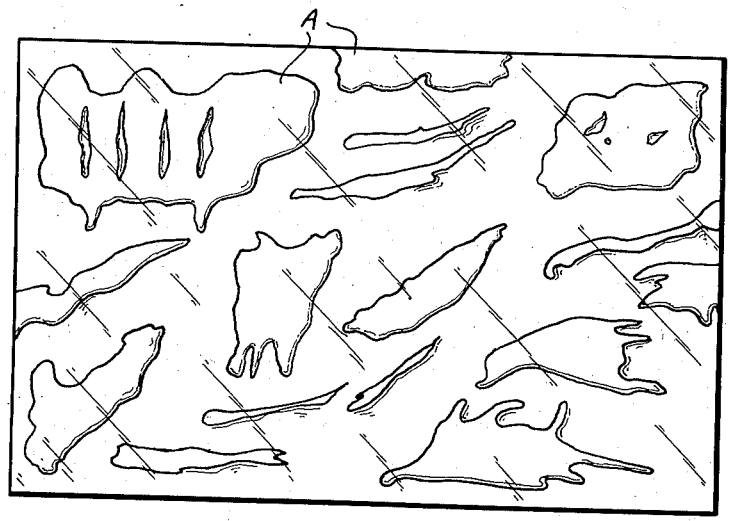
Fig. 11 is a plan view of the sheet shown in Fig. 9, indicating the appearance thereof when examined by polarized light.

After treatment of the sandwich with the machine of Fig. 7, the laminations are not in any sense bonded together to give a safety glass structure. To the contrary, the laminations may be very readily separated and, when examined by polarized light, give an appearance similar to the one illustrated diagrammatically in Fig. 11. The areas A in Fig. 11 are intended to show highly plasticized plastic areas or pools of soft plastic material between the glass and preformed plastic sheet, which will be more fully explained hereinafter. I wish to emphasize that when the glass sandwich has been subjected to the roll treatment, it is not finally composited safety glass in any sense of the word, as the laminations are not bonded together, and I overcome this lack of bond by following with a rather prolonged heating of the sandwiches in absence of pressure to bring about final compositing.

In Fig. 8 is shown a tunnel, cabinet, or other chamber 46 which may be provided with a conveyor 47 to carry the sandwiches therethrough. Any suitable form of heating elements 48 may be employed for controlling the temperature within said member 46. While the glass sandwiches B in Fig. 8 are shown in a horizontal position, I have found that the same satisfactory results can be obtained if the sandwiches are mounted in a vertical position provided precautions are taken to prevent the laminations from slipping with respect to one another or falling apart. The sandwiches are subjected to the heat treatment a sufficient length of time to induce diffusion of the plasticizer throughout the preformed plastic sheet and plastic coatings on the glass to bring about an equalization of plasticizer content; that is, the plasticizer content of the preformed sheet is increased while the plasticizer content of the coatings on the glass is diminished. Actually, as I use the same type of plastic on the glass as is used in the preformed sheet, the three layers of plastic amalgamate into a single, homogeneous interlayer of substantially predetermined and uniform plasticizer content.

In Figs. 9, 10, 11 and 12, an attempt has been made to illustrate diagrammatically my analysis of what takes place when following my teachings, but obviously there may be other and perhaps more accurate explanations made as to why and how such process works, so that it will be understood that I am depending on the process used and article resulting, rather than "theory" of operation.

Practically, the glass sheets used, whether ordinary window glass or plate glass, do not possess surfaces which are absolutely flat or optically true, so that broadly speaking we may refer to said surfaces as being wavy. Likewise, the surfaces of the preformed plastic sheeting are not absolutely true and flat, and while preformed sheeting can be made with a reasonably uniform gauge thickness and flatness of surface, there are variations which I have attempted to illustrate in Fig. 9.

It will thus be appreciated that if the preformed sheet and glass sheets are merely placed one on top of the other, the preformed sheet will not have continuous contact with the glass sheets throughout their areas because of high and low spots and other variations that exist. Heretofore, to bring the thermoplastic material into intimate contact with the glass sheets throughout their entire areas, it has been the practice to take advantage of the thermoplastic properties of the interlayer between the glass sheets by applying substantial heat and substantial pressure to the sandwich. As is well known, adhesives or other bond inducing mediums have been used to obtain the desired adhesion between the glass and plastic laminations, but the heat and pressure treatment has been relied upon to mold the plastic between the glass sheets to take care of non-conformities between the plastic and glass surfaces. While the main idea in subjecting the sandwich to heat and pressure has been to mold the plastic between the glass sheets, actual practice has shown that in most cases the glass sheets themselves are deformed to some extent, even when the sandwiches are subjected to hydraulic pressure as in an autoclave.

Therefore, it is my opinion, based on practical experience with the manufacture of laminated safety glass over a period of years, that the bonding together of commercial sheets of glass and plastic which have a non-continuous contacting relationship at time of assembly involves a combination of plastic deformation and glass deformation to bring about continuous contact between said plastic and glass throughout their entire areas. That is, the plastic being a thermoplastic is heated to a temperature high enough to obtain sufficient plasticity to permit displacement or molding of the plastic between the glass sheets for the purposes just stated, and when subjecting the sandwich to high pressure as well as high heat to get the desired molding, the glass sheets themselves are displaced or deformed to some extent, the degree of which is dependent of course upon the uniformity of thickness of the glass and plastic layers and the planity of the surfaces of such laminations at time of assembly.

My process differs from the above in that, strictly speaking, I do not mold the preformed thermoplastic sheet to the glass surfaces, nor do I deform the glass sheets to render them in contacting relationship to the said preformed sheet. Rather, I place between the glass and thermoplastic interlayer a very highly plasticized plastic layer or film capable of readily molding or adapting itself to conform to the contours of both the glass and plastic sheets at the temperature present when assembly is made. This plastic layer interposed between the preformed sheet and glass sheet, while very highly plasticized in comparison to the plasticizer content of the preformed sheet, nevertheless has sufficient body and plastic mass characteristics to completely fill up the space or voids between the glass and preformed sheet when they are in normal relaxed condition. As a practical precaution and to insure that adequate, richly plasticized plastic will be present between the glass and preformed sheet, I initially apply a moderate excess of such material and then, after assembly, the excess is removed. By including an excess of the richly plasticized plastic, it is possible to "float" the glass upon the preformed sheet at assembly temperatures and the amount of richly plasticized plastic retained within the sandwich will of course depend upon the flatness of the glass and preformed sheet surfaces.

Figure 9:
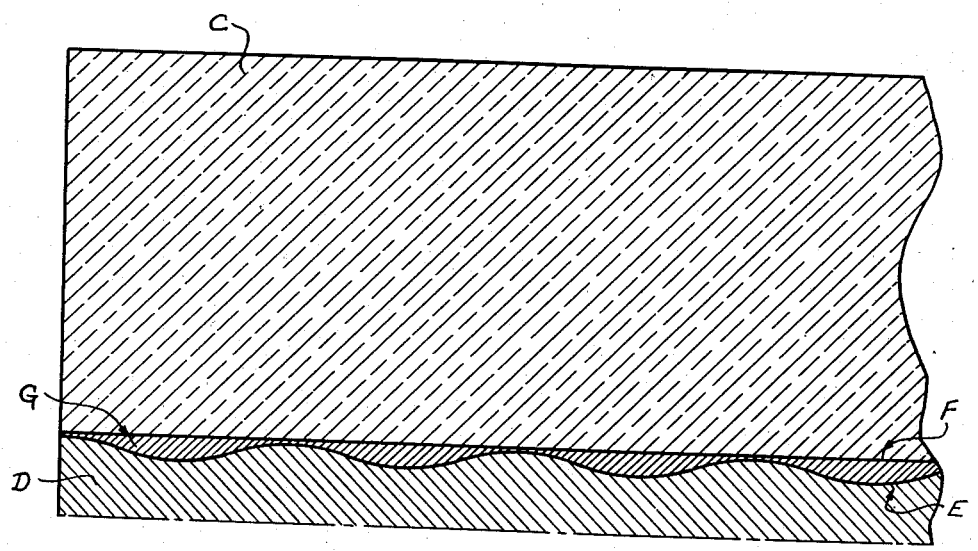
Fig. 9 is a fragmentary sectional view on an enlarged scale intended to illustrate how the highly plasticized plastic mass readily molds itself to the surfaces of the glass and preformed plastic sheet while at the same time filling in the entire space between said surfaces. This is a view of the glass to show the conditions of the plastic before the heat soaking treatment.

In Fig. 9, the letter C designates one of the sheets of glass of the safety glass sandwich, and the letter D the preformed thermoplastic interlayer. The line E is intended to represent the uneven or wavy surface of the preformed sheet D, and while I have shown the surface F of the glass sheet as flat, it will be appreciated that it likewise is wavy. The letter G indicates the highly plasticized plastic coating interposed between the glass sheet C and the preformed thermoplastic D. It will be noted that the layer G completely fills the space between the two sheets and is not of uniform thickness. It may be pointed out that Fig. 9 represents the conditions of the glass and thermoplastic layer and plastic coating G after excess material has been squeezed from between the laminations. Prior to assembly, the coating G is of substantially uniform thickness but, because of its high plasticization when the wavy surfaces of the two sheets are brought together, the excess of moldable coating G is expelled from between the laminations, leaving just that amount required to completely close up the gap or gaps between said laminations.

The preformed temperature present at time of assembly and squeezing of excess of readily moldable coating G from between the laminations is of course dependent upon the particular thermoplastic D and composition of the richly plasticized layer G. It will be understood, however, that regardless of the specific materials used, the temperature should be controlled in such manner that the plastic layer G will not run in uncontrolled manner but will remain upon the glass or thermoplastic until it is forcefully squeezed therefrom. On the other hand, the temperature should be high enough to permit molding of the said richly plasticized plastic layer G between the glass and preformed plastic D without deformation of the glass sheet or noticeable molding of the preformed thermoplastic sheet at time of assembly. This then will result in a condition substantially as illustrated in Fig. 9, at which time the laminations are in non-bonded relationship, because, although the glass is floated into position upon the thermoplastic layer and the soft plastic G fills the voids that would otherwise be present if it were not for such material, the laminations can readily be separated from one another, and in no sense of the word is the sandwich so produced a laminated safety glass capable of use as such. However, to change this condition and bring about the necessary adhesion or bond between the laminations, I then subject the sandwich to heat treatment which I call a heat soaking treatment.

Before this heat soaking treatment, the glass of Fig. 9, when examined by polarized light, gives an appearance such as is shown in Fig. 11 where the areas A are intended to represent greater thicknesses of the moldable plastic material G, which of course have different refractive indices than the main body of the preformed sheet D, which may thereby result in the optical effect noted when examined with polarized light. Therefore, roughly, it may be said that the areas A represent substantial thicknesses of the richly plasticized layer G created by hollows or low spots in the plastic or glass, or both, which in turn represent areas where there would be no contact between the glass and plastic if it were not for the presence of the material G.

Figure 10:
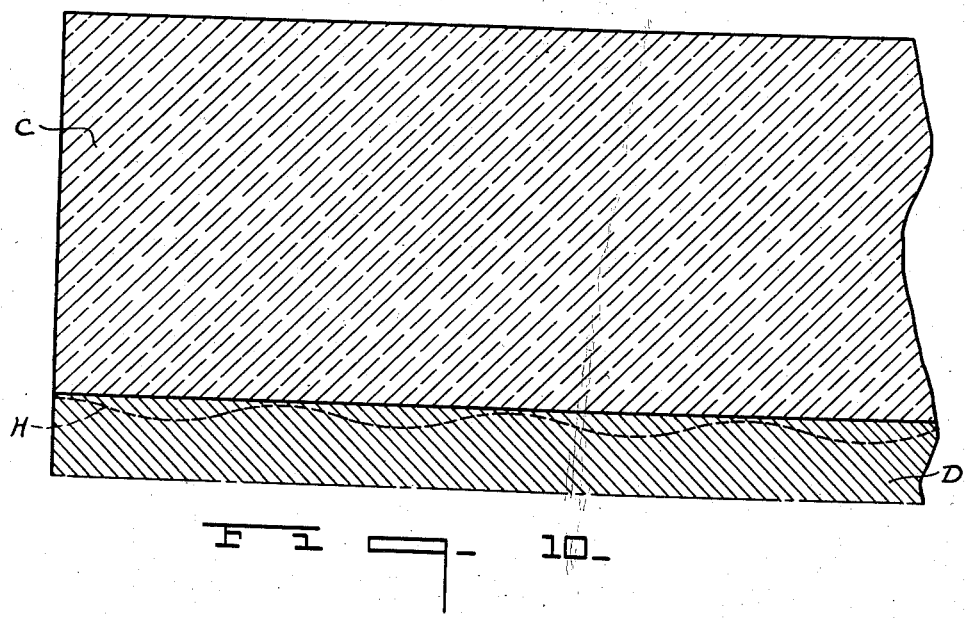
Fig. 10 is a similar view showing the condition of the plastic interlayer after the heat soaking treatment.
Figure 12:
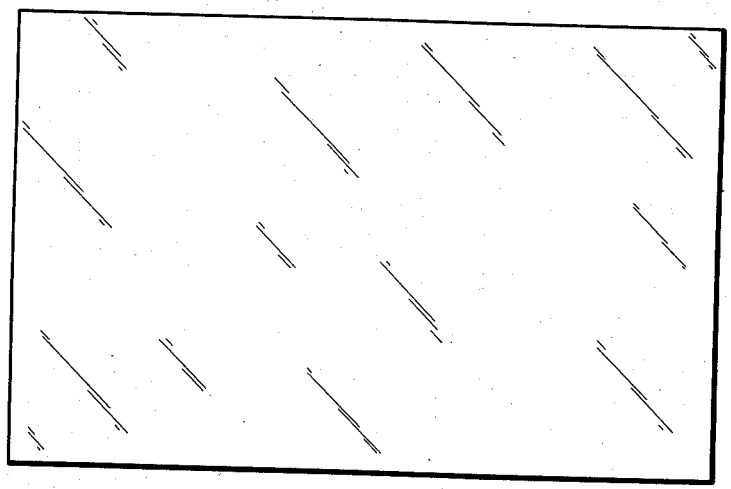
Fig. 12 is a similar view under polarized light after the heat soaking treatment has been completed.

Figs. 10 and 12 represent the same glass after the heat soaking treatment carried on without the exertion of any pressure whatever upon the sandwich. When the heat soaking treatment is started, the material G contains a much greater ratio of plasticizer to the plastic base material (synthetic resin or cellulosic derivative) than the preformed sheet D. As the heat soaking treatment progresses, the plasticizer content of the highly plasticized layer G and the plasticizer content of the preformed sheet D becomes equalized by diffusion, and the progress of the diffusion is definitely shown by examination from time to time under polarized light until the point is reached where the refractive index of the entire plastic layer between the glass is uniform, resulting in the disappearance of the areas A in Fig. 11. After this takes place, the interlayer is a homogeneous mass extending from glass surface to glass surface and does not consist of the preformed sheet D and moldable plastic layers G.

The dotted lines H in Fig. 10 represent the surface of the preformed sheet D before diffusion of plasticizer and adjustment of the plastic take place. It is thus obvious that I do not depend in any way upon the use of pressure to obtain final compositing of the glass and plastic laminations and resort to heat treatment only to bring about a diffusion between like plastic layers having widely differing plasticizer contents on the basis of raw plastic base (synthetic resin or cellulosic derivative) present in said plastic layers. This treatment does not result in deformation of the glass or utilization of the thermoplastic properties of the plastic materials in that pressure is not used to produce molding. The molding which I obtain is a combination of filling in of cavities coupled with subsequent diffusion of plasticizer in presence of heat, taking into consideration of course any displacement of the plastic that might result from such treatment.

To further illustrate the manner in which my invention may be utilized, additional examples of practical applications which have been made are given.

*Example 2*

Assuming that the thickness of the thermoplastic interlayer 21 of the safety glass in Fig. 1 is only .015 inch in thickness instead of .025 inch and that the interlayer is a polyvinyl butyr acetal resin plasticized with approximately 50 parts suitable plasticizer per 100 parts resin, the following formulas or their approximations can be used:

One square inch of .015 inch polyvinyl butyr acetal plastic weighs approximately 0.273 gram. This square inch of plastic contains 0.162 gram of resin and 0.091 gram of plasticizer. To practice the invention, one could make up a sheet approximately .013 inch in thickness containing 0.177 gram of resin and 0.056 gram of plasticizer; that is to say, a preformed plastic sheet containing about 32 parts of plasticizer. One surface each of the two sheets of glass is then coated with a plastic composed of 87.5% plasticizer and 12.5% resin. Approximately 0.02 gram of this richly plasticized plastic is deposited per square inch of glass surface. In this manner a total of 0.04 gram of plastic would be deposited for each square inch of plastic interposed. As can be readily seen, this 0.04 gram of plastic is composed of 0.005 gram of resin and 0.035 gram of plasticizer per square inch. It is now apparent that by adding the 0.177 gram of resin present in the preformed sheet to the 0.005 gram of resin present in the plastic coating on the glass, one would obtain a total of 0.182 gram of resin per square inch. Likewise, by adding 0.056 gram of plasticizer present in the preformed sheet to the 0.035 gram of plasticizer present in the mobile plastic on the glass, one would thus obtain a total of 0.091 gram of plasticizer per square inch of plastic. Dividing 0.091, the total weight of plasticizer present per square inch, by 0.182, the total weight of resin present per square inch, we obtain a ratio of 50 parts of plasticizer to 100 parts of resin which is the desired composition for the lamination.

These proportions will give an interlayer having the exact amount of plasticizer desired. However, to employ the no pressure method of final compositing, a small excess of the mobile plastic layer should be present at time of assembly to permit "floating" of the glass sheets into place upon the preformed sheet and subsequent removal of the excess of the leveling layer. In some cases, in addition to the excess of readily moldable plastic, it may be desirable to flush said plastic and/or the preformed sheet with plasticizer at time of assembly to further increase the mobility of the leveling layer and to serve as an efficient air chaser when the sandwich is subjected to sufficient non-bonding pressure to remove excess plastic and plasticizer if such is present.

My actual experience in the running of many tests and in the production of laminated safety glass made and sold commercially embodying these discoveries, has shown that the use of excess plastic and plasticizer in the manner just referred to results in a plasticizer content variation of only approximately 1 part of plasticizer per 100 parts of plastic, which variation can ordinarily be tolerated.

Example 3

Two sheets of cleaned glass, such as taken from a washing machine and at a temperature of approximately 90 degrees to 120 degrees Fahrenheit, are sprayed with a plastic composition made by compounding 3 parts of polyvinyl acetal resin in 97 parts of plasticizer such as dibutyl phthalate, triethylene glycol dihexoate or dibutyl sebacate. The plastic composition is made by working the resin with the plasticizer at a temperature above 248 degrees Fahrenheit, at which temperature mixing occurs readily. The plastic mass so formed is then vigorously agitated while cooling to room temperatures, resulting in a mass composed of plasticizer and dispersed jelly-like particles of the resin. In making this plastic composition, if sufficiently vigorous agitation is not employed during the cooling operation, the resin may separate in the form of a gel at the bottom of the container in which it is made. The resin used in this work was a polyvinyl butyr acetal resin made by reacting butyraldehyde with polyvinyl alcohol formed by the hydrolysis of polyvinyl acetate of a viscosity of 25 centipoises when measured in molar benzene solutions at 60° F. An analysis of the resin is tabulated below:

| | Percent |
|---|---|
| Polyvinyl acetate content as vinyl acetate | 0.5 |
| Polyvinyl acetate content as vinyl alcohol | 19.2 |
| Polyvinyl butyracetal content | 79.5 |

The plastic composition just described can be successfully deposited on two sheets of glass, and a preformed sheet of polyvinyl acetal resin plastic .015 inch in thickness is then interposed therebetween. The preformed resin plastic sheet employed is made by compounding the polyvinyl acetal resin described above with a plasticizer (triethylene glycol dihexoate, or the like) and the sheeting itself analyzes 69% resin and 31% plasticizer. The sandwich so formed may then be passed through the machine shown in Fig. 7, with the roll clearance being .160 inch, and an air pressure of 10 pounds. The sandwich so formed is in an unbonded condition as is readily proved by the fact that it can be easily separated by insertion of a knife blade and the individual laminations recovered. This sandwich is then subjected to a temperature of approximately 165 degrees Fahrenheit to give it a preliminary set to overcome slippage difficulties, and if the laminations are to be immersed in a liquid for heating but not under pressure it is found that this preliminary heating prevents the ingress of the heating liquid by seepage.

Following this preliminary heat treatment, the sandwiches are then subjected to a temperature of 240 degrees Fahrenheit for a period of one-half hour. I have found that in the case of the particular laminations made with the polyvinyl acetal resin plastics, relatively higher temperatures can be advantageously employed for the final heat soaking treatment than when making glass-cellulosic derivative safety glass, inasmuch as the vapor pressures of the constituents of these plastics are in most cases considerably lower than in the case of the cellulose derivative plastics. In some instances we have employed temperatures as high as 260 degrees Fahrenheit without the production of bubbles or other defects in the finished laminations. In any event, the temperature used should not approach that temperature at which the vapor pressures of the constituents become high enough to produce "bubbling."

Example 4

Two sheets of cleaned glass are heated to a suitable temperature which may be varied as desired, say 200 degrees Fahrenheit, and then passed through the plastic coating machine (Fig. 4) equipped with steam heated rolls (temperature about 212° F.). The temperature and concentration of the plastic material, spacing of the rolls, etc. are controlled to give the proper thickness of mobile plastic on the glass surfaces (.01 to .02 gram per square inch). The richly plasticized plastic used may be made by compounding 5 parts of the polyvinyl acetal resin, referred to above, with 95 parts of plasticizer, although it must be borne in mind that this concentration may be increased upwards or downwards depending upon the amount of plastic to be placed on each square inch of glass surface.

In preparing the plastic for coating the glass, the mixture is preferably heated to a temperature approximately 257 degrees Fahrenheit, at which temperature compounding readily occurs. This highly plasticized plastic mass is then supplied to the coating machine, and after the glass is coated with the highly plasticized layer of plastic, it is allowed to cool somewhat before interposition of the preformed sheet of polyvinyl acetal resin plastic lest excessive shrinkage of the plastic layer occur. At the same time I have made the remarkable discovery that as the temperature of the plastic mass on the glass is decreased, some exudation or syneresis of the plasticizer from the highly plasticized plastic layer occurs. This is important inasmuch as I thereby supply a novel air chaser in the form of the exuded plasticizer for excluding non-condensable gases present at the time of assembly.

The sandwich so formed may then be passed through the machine shown in Fig. 2, or its equivalent, and then heated for a short time at a lower temperature, say 200 degrees Fahrenheit, to produce an initial set between the unbonded plastic layers. The sandwich is then heated to a temperature of about 240 degrees Fahrenheit or even higher for a period of approximately one-half hour. The lamination so formed is free of apparent optical defects and possesses excellent adhesion, good stability, and if the ratio of plasticizer in the preformed sheet and the adhesive layer is controlled in the manner pointed out above, the break characteristics of the product at various temperatures are found to be satisfactory in every respect.

Example 5

Two sheets of glass, after washing, and at a suitable temperature, are passed through the machine shown in Fig. 4, and a film weighing approximately 1/100 of a gram per square inch is deposited thereon. Plastic used for coating the glass in this instance is made by compounding 5 parts of cellulose acetate (which has been reacted with hydrochloric and phosphoric acids to render it adherent toward glass while remaining compatible with unreacted cellulose acetate of the same kind) with 95 parts of dimethyl phthalate at an elevated temperature (approximately 212 degrees F.).

A preformed sheet of cellulose acetate (100 parts cellulose acetate plasticized with 80 parts of dimethyl phthalate) is then dipped in a bath of dimethyl phthalate and, when thoroughly wet on both surfaces, is interposed between the two sheets of plastic coated glass and the glass and plastic aligned in proper relationship. The sandwich so formed is then pressed to exclude all non-condensable gases and to remove excess plastic and plasticizer from the sandwich. While any suitable pressure means can be employed, it may be helpful to explain that one form of machine that has been used is shown in Fig. 7 and had the following specifications:

Length of rolls 18 inches; diameter of the rolls 3 inches; air pistons used on each end of the roll were 5 inches in diameter; pressure on the air pistons 45 to 50 pounds per square inch. The clearance of the first two rolls was .160 inch and on the other pair of rolls .190 inch. The rubber hardness of the rolls was 27 (as measured by the rubber hardness durometer type A, Shore Instrument & Manufacturing Company). After this pressure treatment, it will be found that the laminations can be slid one upon the other, showing an entire lack of bond, and some care has to be exercised because if the laminations are permitted to slip and are then returned to proper alignment, air may be introduced between the laminations.

The appearance of the sandwich at this point is misleading because it is entirely free of all visible defects in ordinary light and resembles a finished lamination, yet it definitely lacks adhesion as proven by ease of slippage of the laminations. Furthermore, examination of the sandwich under the polariscope shows very clearly the presence of numerous colored areas, indicating lack of suitable uniformity. The lamination is then subjected to a relatively short heat treatment in an oven or leer at a temperature of approximately 165 degrees Fahrenheit, although higher temperatures, such as 225 degrees Fahrenheit, can ordinarily be employed satisfactorily. This short heat treatment causes the plasticizer to act upon the preformed plastic sheet sufficiently to overcome possible slippage between the laminations. However, if examined at their juncture under the polariscope or subjected to the customary crush tests, it will be found that the laminations are not bonded together. The time of heating may be varied from approximately ten to fifteen minutes at 165 degrees Fahrenheit downwards to five minutes at 225 degrees Fahrenheit. The sandwiches at this point may then be placed flatwise or on end in a leer or into a heating tank maintained at a temperature sufficiently low as not to produce bubbles during the final heat soaking treatment.

In practice, I have found that a temperature of 225 degrees Fahrenheit is perfectly satisfactory, although results indicate that temperatures higher than 225 degrees Fahrenheit, namely 240 degrees Fahrenheit, may also be employed in some instances. The time of heating necessary to finish the lamination in this heat treatment is approximately one and one-quarter hours at a temperature of 225 degrees Fahrenheit, although longer heating may be necessary where the plasticizer content of the sheet is lower than that indicated above. My results to date indicate that as the temperature of heating in this final treatment is increased, the time required to finish the lamination is correspondingly lowered. In order to tell whether the lamination has been heated long enough, it can be periodically removed from the heating cabinet, leer, or tank and, after cooling, examined under polarized light. When the laminations appear under polarized light to be devoid of localized areas, the lamination has been treated long enough. Glass made by this process, when subjected to impact tests, boil tests, crush (adhesion) tests, roof tests, and accelerated weather tests, has been shown to be exceedingly stable and possesses the requisite strength of a commercially salable laminated glass.

As a variation of the above example, instead of dipping the plastic before or during the assembly operation, the plastic coated glass sheets may be "wet" by spraying or dipping with plasticizer, or the entire sandwich may be assembled in a bath of plasticizer without adversely affecting the results obtained.

Example 6

In this example the plastic coating is made somewhat thicker than that employed in the preceding example; that is, it is made approximately 1/100 to 1/200 grams per square inch. It may be pointed out that the thickness of the plastic coating used can be varied by changes in the coating machine itself and by the changes in the temperature of the plastic or changes in the temperature of the glass to be coated. There is no upper limit on the amount of readily moldable plastic that can be employed except that good practice requires that waste of material be avoided. The composition of the plastic used in this process was 97 parts of dimethyl phthalate and 3 parts of the reaction product cellulose acetate mentioned in Example 5. In this instance, the amount of reaction product in the plastic was purposely lowered to render the mobile plastic layer even more readily flowable during the step of removing excess material. If it is desired, the plasticity of the coating on the glass can be further increased by heating the coated glass to a slightly elevated temperature such as 120 degrees Fahrenheit. If the plastic coated glass is heated to temperatures much above 120 degrees Fahrenheit, it is found that the preformed sheet of cellulose acetate plastic when inserted between the heated glass sheets will shrink and produce defective laminations. This shrinkage, I believe, is due to internal strains within the plastic sheet itself and can be relieved by application of heat.

The pressure rolls used in removal of excess plastic from between the laminations were arranged to have a clearance of .085 inch, using 50 pounds pressure on the 5 inch pistons, and the rubber rolls had a hardness of 75 on the durometer.

Example 7

Two sheets of cleaned glass were coated with a plastic layer composed of 4 parts of cellulose acetate reaction product (described in Example 5) compounded with 48 parts of dimethyl phthalate and 48 parts of diethyl phthalate. This plastic was prepared by mixing the cellulose acetate reaction product with the dimethyl phthalate at an elevated temperature, say 212 degrees Fahrenheit. To this plastic mass was then added, at an elevated temperature, 48 parts of diethyl phthalate. If this plastic mass is allowed to cool to room temperature, it separates forming a gel from which exudes some of the plasticizer mixture. For this reason, it is impractical to apply this plastic mixture to the glass at ordinary working temperatures. To overcome this separation and to produce good plastic layers on the glass sheets, the rolls of the coating machine were heated to an elevated temperature, say 150 to 212 degrees Fahrenheit, the temperature depending upon the thickness and nature of the plastic deposit desired, temperature of the glass, spacing of the rolls, etc. Since this plastic at elevated temperatures attacks ordinary rubber rolls, it was found necessary to replace the heated rubber rolls by some other material. While experimentation may show that a rubber or other type of roll of suitable composition can be employed for this purpose, I found it necessary to resort to the use of a metal roll wrapped with several layers of canvas. This modification of the metal rolls applies only to the glass contacting roll and the roll in turn contacting it.

As the plastic on the glass cools, the exudation of plasticizer referred to above takes place, producing a novel air chasing film of plasticizer on the surface of the plastic layer. A preformed sheet of cellulose acetate plastic was then inserted between the two sheets of plastic coated glass and the sandwich put through the machine shown in Fig. 7, where the exuded plasticizer acts as an air chaser and the excess exuded plasticizer or plastic are removed.

The sandwiches so formed were then heated to a temperature of 160 degrees Fahrenheit for a period of three minutes, and again passed through the pressure rolls. These laminations were then completed by heating to 240 degrees Fahrenheit for one to two hours.

The layers or coatings of readily moldable plastic interposed between the glass and preformed plastic sheet are referred to herein as being non-volatile and compatible with said preformed sheet. This is intended to mean that the plastic is of such nature that when applied to the glass it does not require drying or any other form of seasoning to remove excess volatile matter and, further, that it is able to blend with and become a permanent integral part of the preformed sheet as distinguished from a coating which definitely retains its own identity without blending with said thermoplastic sheet to form a single plastic interlayer.

I claim:

1. The process of producing laminated safety glass comprising two sheets of glass and an adherent interlayer of transparent plastic, including the steps of preparing a preformed plastic sheet whose plasticizer content is substantially less than the plasticizer content of said interlayer, forming a layer of the same plastic as that constituting the preformed sheet on one surface each of two sheets of glass, said layers differing from the preformed sheet in that they contain a substantially and predetermined higher plasticizer content than that of the preformed sheet and said plastic interlayer, then interposing the preformed sheet between the coated surfaces of the glass sheets, and then subjecting the sandwich so formed to elevated temperatures to induce diffusion of plasticizer throughout the preformed sheet and plastic layers on the glass to give a permanently bonded, homogeneous interlayer of substantially predetermined and uniform plasticizer content and thickness.

2. The process of producing laminated safety glass comprising two sheets of glass and an adherent interlayer of transparent plastic, including the steps of preparing a preformed plastic sheet having a substantially predetermined plasticizer content and less than that required to render it tacky at normal temperatures, forming a layer of the same plastic as that constituting the preformed sheet on one surface each of two sheets of glass, said layers differing from the preformed sheet in that they have incorporated therein a substantially predetermined larger amount of plasticizer and more than sufficient to render said layers tacky, then interposing the preformed sheet between the coated surfaces of the glass sheets, and then subjecting the sandwich so formed to sufficient heat to induce uniform diffusion of plasticizer throughout the preformed sheet and plastic layers on the glass to give a permanently bonded, homogeneous interlayer of substantially predetermined and uniform plasticizer content, the plasticizer content of the interlayer being substantially greater than that of the original preformed sheet and substantially less than that of the original plastic layers applied to the glass sheets.

3. The process of producing laminated safety glass comprising two sheets of glass and an adherent interlayer of transparent plastic, including the steps of facing one surface each of two sheets of glass with a layer of plastic containing sufficient plasticizer to render it readily moldable at the temperature of application, then arranging between said plastic layers a preformed sheet of plastic material with which said layers of moldable plastic on the glass are compatible and which has incorporated therein a plasticizer content substantially less than that of the plastic layers on the glass so that the said preformed sheet is not readily moldable at the temperature of application, and then subjecting the glass and plastic layers to heat to disperse the plasticizer throughout the plastic layers to produce a single homogeneous plastic interlayer of substantially predetermined plasticizer content which is permanently bonded to the glass sheets.

4. The process of producing laminated safety glass from two sheets of glass and a sheet of preformed plastic, comprising the steps of applying to one surface each of the two sheets of glass a non-volatile layer of plastic which is much more readily moldable at the temperature of application than the preformed plastic sheet at said temperature, then interposing the preformed plastic sheet between the glass sheets, pressing the sandwich so formed together into non-bonded relationship, and then, in absence of pressure upon the sandwich, subjecting the glass and plastic to heat to render them permanently adherent to one another.

5. The process of producing laminated safety glass from two sheets of glass and a sheet of preformed plastic, comprising the steps of applying to one surface each of the two sheets of glass a non-volatile layer of plastic compatible with said preformed sheet, interposing the preformed plastic sheet between the coated surfaces of the glass sheets, pressing the sandwich so formed into non-bonded relationship, the layers of plastic initially applied to the glass sheets containing sufficient plasticizer to render the same readily moldable at the temperature of application and capable of adapting itself to completely fill the space between the glass sheets and preformed plastic sheet after the pressing step, and then subjecting the sandwich so formed to heat and for a time adequate to induce uniform diffusion of plasticizer throughout the preformed sheet and plastic layers on the glass to give a permanently bonded, homogeneous interlayer of substantially predetermined and uniform plasticizer content.

6. The process of producing laminated safety glass from two sheets of glass and a sheet of preformed plastic, comprising the steps of applying to one surface each of two sheets of glass a substantial layer of mobile, readily moldable plastic compatible with said preformed plastic sheet, interposing the preformed plastic sheet between the glass sheets, the plasticizer content of said preformed sheet being substantially less than that of the plastic layers on the glass, then pressing the sandwich so formed into non-bonded relationship, and then rendering the glass and plastic permanently adherent to one another by a non-pressure heat soaking treatment.

7. The process of producing laminated safety glass from two sheets of glass and a sheet of preformed plastic, comprising the steps of applying to one surface each of two sheets of glass a non-volatile, readily moldable plastic which is compatible with and has a substantially higher plasticizer content than said preformed plastic sheet, interposing the preformed plastic sheet between the glass sheets and pressing the sandwich so formed into non-bonded relationship, said plastic layers on the glass being molded to conform to the contours of the glass and preformed plastic and to completely fill the space therebetween without deformation of the glass or the preformed plastic, and then rendering the glass and plastic permanently adherent to one another by a non-pressure heat soaking treatment which induces diffusion of plasticizer throughout the preformed sheet and plastic layers on the glass to give a homogeneous interlayer of substantially predetermined and uniform plasticizer content.

8. The process of producing laminated safety glass from two sheets of glass and a sheet of preformed plastic, comprising the steps of applying to one surface each of two sheets of glass an excess of readily moldable plastic which is compatible with said preformed plastic sheet, then interposing the preformed plastic sheet therebetween, pressing the sandwich so formed together into non-bonded relationship and to expel the excess of moldable plastic previously applied to the glass sheets, and then finally rendering the glass and plastic permanently adherent to one another by a non-pressure heat soaking treatment which converts the plastic layers on the glass and the preformed sheet into a homogeneous interlayer of substantially predetermined and uniform plasticizer content.

9. The process of producing laminated safety glass from two sheets of glass and a sheet of preformed plastic, comprising the steps of applying to one surface each of two sheets of glass an excess of non-volatile, mobile plastic layer whose plasticizer content is substantially greater than that of the preformed sheet with which said plastic layers are compatible, then interposing the preformed plastic sheet between the glass sheets and pressing the sandwich so formed together into non-bonded relationship to expel the excess plastic coating initially applied to the glass sheets, the said plastic coatings being molded to conform to the surfaces of the glass and preformed sheet and to completely fill the spaces therebetween without deformation of the glass and preformed sheet, and then finally compositing the sandwich by subjecting it to a non-pressure heat soaking treatment which produces a homogeneous interlayer of substantially predetermined and uniform plasticizer content permanently adherent to the glass sheets.

10. The process of producing laminated safety glass from two sheets of glass and a sheet of preformed plastic, comprising the steps of supplying to one surface each of two sheets of glass a non-volatile layer of plastic compatible with and having a higher plasticizer content than the preformed sheet, adjusting the temperature at time of application of said plastic to the glass sheets and subsequently thereto to induce exudation of some of the plasticizer from said layers on the glass, then interposing the preformed plastic sheet between the glass coated sheets, pressing the sandwich so formed together into non-bonded relationship and to expel from the sandwich excess exuded plasticizer, and then finally rendering the glass and plastic permanently adherent to one another by a non-pressure heat soaking treatment.

11. The process of producing laminated safety glass from two sheets of glass and a sheet of preformed plastic, comprising the steps of floating a sheet of glass on each side of a preformed sheet through the intermediary of a mobile plastic layer which is compatible with said preformed sheet, pressing the sandwich so formed into non-bonded relationship and to expel excess mobile plastic from between the glass and preformed sheet, said pressed glass when examined by polarized light showing colored areas indicating lack of suitable uniformity of plastic interlayer, and then permanently bonding the glass and plastic together by subjecting the sandwich to sufficient non-pressure heat soaking treatment for an adequate length of time so that upon further examination by polarized light, said colored areas have disappeared, indicating that the plastic between the glass is a homogeneous interlayer of substantially uniform plasticizer content.

12. The process of producing laminated safety glass from two sheets of glass and a sheet of preformed plastic, comprising the steps of arranging three layers of differentially plasticized plastic between two sheets of glass, the central layer of plastic being relatively non-moldable at the temperatures of application and the other two layers of plastic being readily moldable at said temperature of application, pressing the sandwich so formed into non-bonded relationship, and then subjecting the sandwich to heat and for adequate time, in absence of pressure, to diffuse the plasticizer uniformly throughout all three of said plastic layers to produce a single homogeneous interlayer permanently bonded to said glass sheets.

13. As a new article of manufacture, a sheet of laminated safety glass, evidencing no internal strain when examined by polarized light, comprising two sheets of glass and an interlayer of plastic in intimate adhering contact with the inner surfaces of said glass sheets, the interlayer being composed of a preformed plastic sheet and facing layers therefor of mobile, readily moldable plastic, said preformed sheet and facing layers being amalgamated in situ between the glass sheets and constituting a single homogeneous interlayer of predetermined characteristics.

14. As a new article of manufacture, a sheet of laminated safety glass, evidencing no internal strain when examined by polarized light, comprising two sheets of glass and an adherent homogeneous plastic interlayer created between the glass sheets from differentially plasticized plastics by heat treatment in absence of pressure.

JOSEPH D. RYAN.